Feb. 2, 1971  M. M. McCLUSKY ET AL  3,560,063
SHAFT SEAL MECHANISM FOR OPEN TYPE FLUID COMPRESSORS
Filed June 23, 1969

INVENTORS.
MARTIN M. MCCLUSKY.
JAMES W. ENDRESS.
BY Raymond Curtin
ATTORNEY.

United States Patent Office 3,560,063
Patented Feb. 2, 1971

3,560,063
SHAFT SEAL MECHANISM FOR OPEN TYPE FLUID COMPRESSORS
Martin M. McClusky and James W. Endress, Syracuse, N.Y., assignors to Carrier Corporation, Syracuse, N.Y., a corporation of Delaware
Filed June 23, 1969, Ser. No. 835,636
Int. Cl. F16c *1/24;* F16k *41/00;* F16j *15/16*
U.S. Cl. 308—36.2                    5 Claims

ABSTRACT OF THE DISCLOSURE

A shaft sealing mechanism for open type fluid compressors, such as refrigeration compressors, in which the operating shaft extends outwardly through the end wall of the compressor bearing housing. The sealing mechanism consists of an assembly of components mounted in the end wall of the bearing housing, the mechanism including running and shut down seals. A common spring means is interposed between the movable elements of the seals and serves to continuously maintain the running seal in sealing engagement and to urge the shut down seal in sealing engagement. The movable element of the shut down seal is carried by a piston which, by the application thereto of hydraulic pressure, prevents engagement of the shut down seal elements but, in the absence of such pressure, the shut down seal is actuated to sealing engagement by the common spring means.

BRIEF SUMMARY OF THE INVENTION

Our invention has as an object a shaft sealing mechanism in the form of an assembly detachably mounted in an end wall of the bearing housing in which the shaft is journalled. It is common practice to provide a running seal and a shut down seal in refrigeration compressors. The running seal is maintained in constant sealing engagement, and the shut down seal is actuated into sealing engagement when the machine is stopped. In some compressor structures, the movable elements of both seals are moved into sealing engagement by springs, the shut down seal being maintained in nonsealing relation during operation of the machine by hydraulic actuated means.

In such prior machines, the sealing mechanism employs a large number of parts and components including separate springs associated with each seal. Such assemblies are costly to manufacture and cannot be readily and conveniently disassembled for repair, or replacement.

Our invention has as an object a combined running and shut down seal mechanism embodying a particularly compact structural arrangement employing few components, the arrangement being such that the mechanism may be quickly and conveniently removed from the bearing housing for repair and replacement.

DETAILED DESCRIPTION

Figure 1:
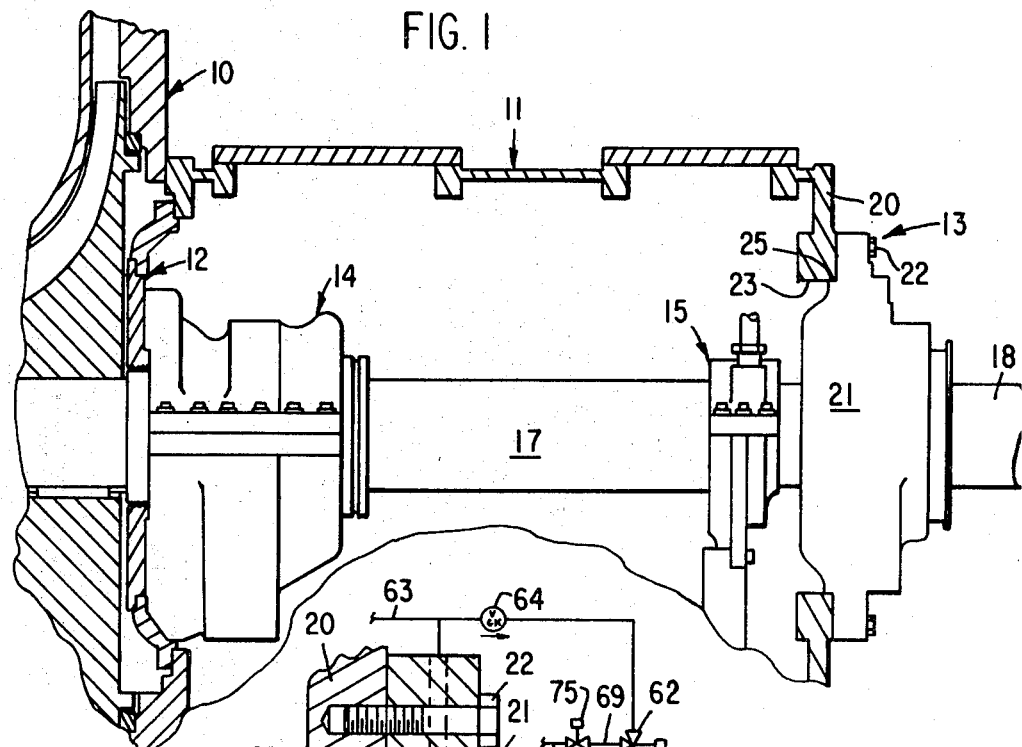
FIG. 1 is a lengthwise, sectional view of the bearing housing of a rotary type gas compressor and including the contiguous portion of the impeller housing.
Figure 3:
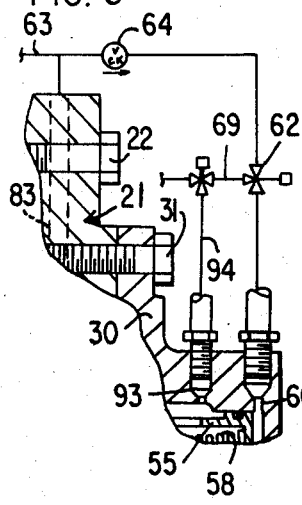
FIG. 3 is a fragmentary view of an embodiment of the sealing mechanism illustrated in FIG. 2.

Referring to FIG. 1, the compressor shown is of the rotary type. The impeller housing is indicated generally at 10. The bearing housing 11 is fixed to the impeller housing and is provided with inner and outer end wall structures 12, 13. Bearings 14, 15 are fixed within the bearing housing 11. The impeller shaft 17 is journalled in the bearings 14, 15 and has an end portion 18 extending outwardly through the outer end wall structure 13.

Figure 2:
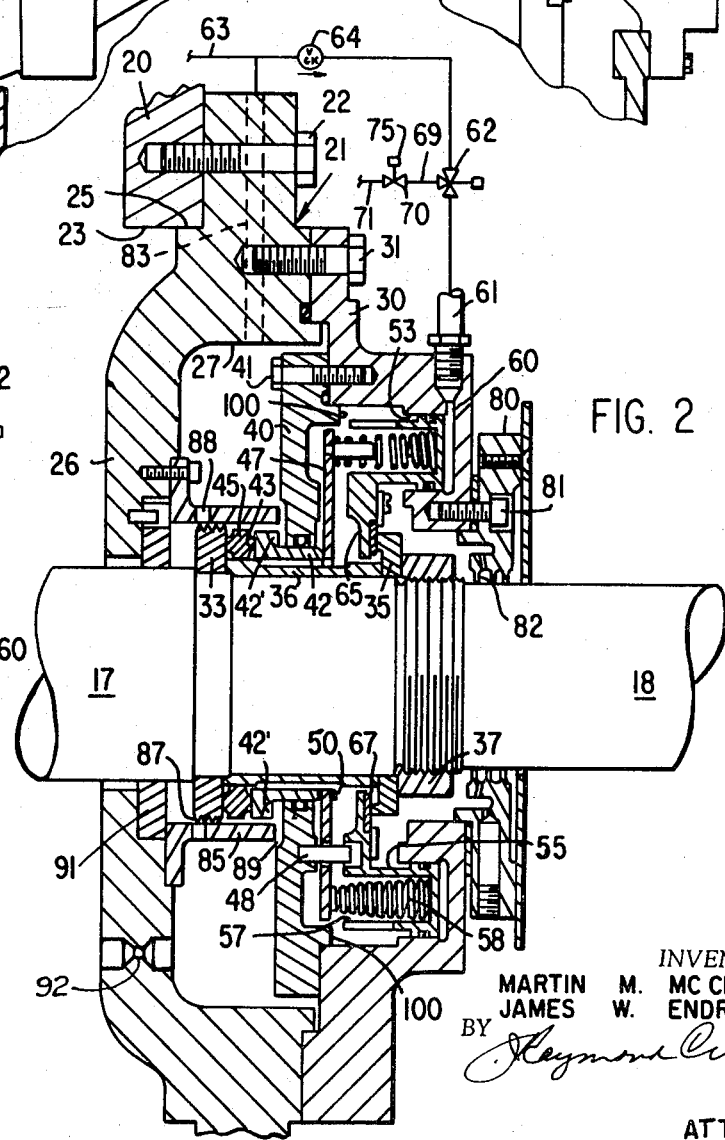
FIG. 2 is an enlarged sectional view taken through the outer end wall of the bearing housing and illustrating the structure of the sealing mechanism.

The end wall structure 13 is shown in the form of a flange 20, to the outer surface of which is secured a member 21, as by cap screws 22. The flange 20 is formed with a bore 23 to receive a shoulder 25 formed on the member 21 to align it concentrically with the shaft 17. The member 21 is formed with an inner discoidal flange 26 provided with a central apperture to receive the shaft 17. The member 21 is formed with an enlarged bore 27 which is closed by a closure member 30 detachably secured to the member 21, as by cap screws 31, see FIG. 2. The member 21 and closure member 30 are formed with interfitting circular shoulders to establish alignment between these parts.

A collar 33 is mounted on shaft 17, and a second collar 35 is spaced axially along the shaft from the collar 33. A spacer sleeve 36 is interposed between the collars 33, 35. A nut 37 is threaded on the shaft against the collar 35, moving it against the sleeve 36 and the latter against the collar 33, whereby the collars 33, 35 are fixed to the shaft.

A circular plate 40 is fixed to the inner surface of the closure 30, as by cap screws 41. The plate 40 is formed with a central aperture to slidably receive a sealing sleeve 42 formed at one end with a radial sealing surface 43. A free floating sealing ring 45 is positioned intermediate the collar 33 and sleeve 42. An annular actuating member 47 is supported and guided by a circular series of pins 48 extending outwardly from the plate 40. The actuating member 47 encircles the shaft 17 and is formed with fingers 50 engaging notches formed in the opposite end of the sealing sleeve 42.

The closure member 30 is formed with an annular recess 53 in which is slidably mounted an annular piston 55. The piston 55 is formed with a circular series of recesses 57. A compression spring 58 is positioned in each of said recesses. The springs 58 act against the actuating member 47 and the bottom walls of the recesses 57 in piston 55.

With this arrangement, the springs 58 exert a constant pressure against the actuator 47, maintaining the sealing sleeve 42 against the free floating ring 45, and the latter against the fixed collar 33 to provide the running seal. The closure member 30 is formed with a passageway 60 connected to an oil line 61 extending from a three-way, solenoid operated valve 62. Oil under pressure is supplied from line 63, through a check valve 64. The line 63 extends from the pump supplying oil pressure to the bearings 14, 15. The oil pump is in continuous operation during operation of the compressor. The oil pressure applied behind the piston 55 effects movement of the piston to the left, FIG. 2, against compression springs 58. The piston is formed with an inwardly extending radial flange 65 which is provided with an annular seal 67 confronting the fixed collar 35. Accordingly, with oil pressure supplied from line 61 behind the piston 55, the shut down seal 67 is maintained out of engagement with the collar 35. The springs 58 are designed to maintain the running seal in effective sealing engagement when the piston 55 is moved in the recess 53 upon relief of oil pressure for movement of the shut down seal 67 into engagement with collar 35.

When the machine and the oil pump are shut down, the oil behind the piston 55 is trapped by check valve 64. However, upon shut down, solenoid valve 62 is operated, permitting discharge of the oil from behind the piston, through branch line 69, to a bleed off valve 70 having an output line 71 discharging the oil to the oil supply reservoir. The valve 70 is adjusted to retard the discharge of oil from behind the piston 55 for a period of time equal to the coast down period of the impeller and shaft, whereby the collar 35 will be stationary upon movement of the shut down seal 67 into engagement with the collar. The valve 70 is controlled by a solenoid 75.

In the event of power failure to the oil pump, the bleed off valve 70 is closed. With the valve 70 closed, the oil is trapped behind the piston 55 by virtue of the check valve 64. As is customary in machines of this type, failure of the oil pump while the machine is in operation, effects a shut down of the machine. However, such a shut down may consume a period of time in excess of the coast down period for which the valve 70 is initially adjusted. This arrangement prevents engagement of the shut down seal while the shaft 17 may be still rotating under such circumstances.

A cap 80 is mounted on the outer end surface of the member 30, as by screws 81 and is formed with a bore provided with a labyrinth seal 82. Oil is supplied to the area of the running seal from line 63 by way of passage 83. A cylindrical flange member 85 is affixed to the inner surface of the flange 26 of member 21, and encircles the running seal structure. The periphery of the collar 33 is formed with a helical rib 87 in close clearance with the inner surface of flange 85 to form a screw oil pump to move the oil about the running seal. Oil is circulated by the screw pump through the radial passage 89 and the cooling fins 42' of sleeve 42 over the floating carbon seal ring 45, and discharged through the openings 88. A positive oil pressure is maintained in the running seal chamber 27 by a floating seal ring 91 and flow control is maintained by an orifice 92 located approximately 180° from the inlet passage 83.

Depending on design of components and to facilitate opening of the shut down seal on start-up, the forces acting on the fixed collar 35 may be reduced by bleeding the oil pressure acting on the internal flange 65 through an auxiliary passage 93. This is accomplished by substituting the two-way solenoid valve 70 for a three-way solenoid valve, the line 69 being normally open and the line 94 being normally closed to a common discharge 71.

Another feature of the seal mechanism disclosed herein is the presence of projection 100 disposed on plate 40. The projection 100 serves as a stop to limit axial movement of piston 55 under the influence of oil pressure delivered through line 60. Thus, compression of springs 58 is limited, restricting the force applied to sleeve 42 through actuator 47. This action extends the life of the running seal by precluding excessive pressure across the assembly.

We claim:

1. An open type fluid compression apparatus including a bearing housing having spaced apart end wall structures, an operating shaft journalled in bearings mounted in said housing and extending outwardly through one of said end wall structures for operative connection to a driving motor, a shaft sealing mechanism mounted in said one end wall structure and comprising a collar fixed to said shaft and having a radial sealing surface, a sleeve encircling said shaft and being mounted for sliding axial movement in said end wall structure toward and from said collar, said sleeve being formed at one end with a radial sealing surface confronting said collar, a free floating sealing ring encircling said shaft intermediate said collar and the sealing surface of said sleeve, said shaft being provided with a second collar fixed thereto and being spaced axially from the opposite end of said sleeve, a piston mounted in said end wall structure for movement in a direction axially of said shaft, said piston being provided with an annular shut down seal encircling said shaft intermediate said second collar and the said opposite end of said sleeve, an annular sleeve actuating member connected to said opposite end of said sleeve, spring means interposed between said actuating member and said piston and operable to yieldingly urge said sleeve against said free floating ring and the latter against said first collar to provide a running seal, means for supplying oil under pressure against said piston to maintain said shut down seal in spaced axial relation to said second shaft collar, said spring means being operable upon relief of oil pressure against said piston to move said shut down seal into sealing engagement with said second collar.

2. A shaft sealing mechanism as described in claim 1, including means for supplying oil to the shaft sealing mechanism during the operation of the fluid compression apparatus and means for venting oil accumulating against the surface of the piston opposite that against which oil is supplied.

3. A shaft sealing mechanism as described in claim 1, including means restraining said sleeve actuating member against rotation.

4. A shaft sealing structure as described in claim 1, wherein said piston is of annular formation, and means restraining rotation of said piston.

5. A shaft sealing structure for rotary type fluid compression apparatus comprising a housing, a running seal including a free floating sealing ring encircling said shaft and being interposed between a collar fixed to said shaft and an annular member encircling said shaft for movement in a direction axially of said shaft against said sealing ring, an actuator connected to said annular member, a second collar fixed to said shaft in axially spaced relation to said first collar, a piston mounted in said housing for movement in a direction axially of said shaft, a second annular member fixed to said piston and having an annular sealing surface confronting said second collar, spring means interposed between said actuator and said piston and operable to yieldingly urge said first annular member against said sealing ring and said second annular member against said second collar, and means for supplying fluid under pressure against said piston to maintain said second annular member in spaced relation to said collar.

References Cited
UNITED STATES PATENTS

| | | | |
|---|---|---|---|
| 1,947,017 | 2/1934 | McHugh | 277—27 |
| 2,128,496 | 8/1938 | Murphy | 308—2 |
| 2,555,492 | 6/1951 | Kidney | 277—86 |
| 3,194,342 | 7/1965 | Heim | 308—36.2 |
| 3,273,899 | 9/1966 | Warnery | 277—3 |
| 3,395,645 | 8/1968 | Vilet | 277—3 |

FRED C. MATTERN, JR., Primary Examiner

W. S. RATLIFF, JR., Assistant Examiner

U.S. Cl. X.R.

277—3, 27